United States Patent
Lee et al.

(10) Patent No.: US 6,864,303 B2
(45) Date of Patent: Mar. 8, 2005

(54) ACRYLIC RUBBER LATEX HAVING BIMODAL PARTICLE DISTRIBUTION

(75) Inventors: Yong-Hun Lee, Yeosoo (KR); Chang-Sun Han, Yeosoo (KR); Dong-Jo Ryu, Yeosoo (KR)

(73) Assignee: LG Chem, Ltd., Seoul (KR)

( * ) Notice: Subject to any disclaimer, the term of this patent is extended or adjusted under 35 U.S.C. 154(b) by 122 days.

(21) Appl. No.: 10/220,738

(22) PCT Filed: Jan. 10, 2002

(86) PCT No.: PCT/KR02/00044

§ 371 (c)(1),
(2), (4) Date: Oct. 3, 2002

(87) PCT Pub. No.: WO02/055572

PCT Pub. Date: Jul. 18, 2002

(65) Prior Publication Data

US 2003/0114597 A1 Jun. 19, 2003

(30) Foreign Application Priority Data

Jan. 11, 2001 (KR) .................................. 2001-0001633

(51) Int. Cl.[7] .............................................. C08F 285/00
(52) U.S. Cl. ...................................... 523/201; 525/309
(58) Field of Search .......................... 523/201; 525/309

(56) References Cited

U.S. PATENT DOCUMENTS

| | | | |
|---|---|---|---|
| 3,562,235 A | | 2/1971 | Ryan |
| 3,830,878 A | | 8/1974 | Kato et al. |
| 4,341,883 A | | 7/1982 | Gift |
| 4,468,498 A | * | 8/1984 | Kowalski et al. ........... 525/301 |
| 4,513,118 A | | 4/1985 | Suetterlin et al. |
| 4,753,988 A | | 6/1988 | Henton et al. |
| 5,039,749 A | | 8/1991 | Seki et al. |
| 5,120,788 A | | 6/1992 | Seitz et al. |
| 5,250,606 A | * | 10/1993 | Guest et al. ................. 524/504 |
| 5,312,575 A | | 5/1994 | Wills |
| 5,612,413 A | | 3/1997 | Rozkuszka et al. |
| 5,883,187 A | | 3/1999 | Chang et al. |
| 6,054,531 A | | 4/2000 | Craig |
| 6,066,693 A | * | 5/2000 | Fischer et al. ................. 525/67 |

\* cited by examiner

*Primary Examiner*—Jeffrey Mullis
(74) *Attorney, Agent, or Firm*—Birch, Stewart, Kolasch & Birch, LLP

(57) ABSTRACT

This invention provides a method for preparing an acrylic rubber latex having a bimodal particle size distribution, comprising the step of; a) preparing seed rubber latex containing i) alkyl acrylate, ii) saturated or unsaturated $C_1$–$C_9$ organic acid, and iii) an acrylic multi-unsaturated monomer; b) preparing a bimodal rubber latex by adding i) alkyl acrylate and iii) an acrylic multi-unsaturated monomer to the seed rubber latex obtained in step a): and c) preparing rubber latex by grafting iv) alkyl methacrylate to the bimodal rubber latex obtained in step b). According to this invention, an acrylic rubber latex can be provided that satisfies the important factors for the improvement of impact resistance, i.e., the particle size of the impact modifier dispersed in a matrix and the distance between impact modifiers, thereby allowing the impact modifier to improve the impact resistance and weatherability of vinyl chloride resin.

10 Claims, No Drawings

ACRYLIC RUBBER LATEX HAVING BIMODAL PARTICLE DISTRIBUTION

This application is the national phase under 35 U.S.C. §371 of PCT International Application No. PCT/KR02/00044 which has an International filing date of Jan. 10, 2002, which designated the United States of America.

BACKGROUND OF THE INVENTION (a) Field of the Invention

The present invention relates to a method for preparing an acrylic rubber latex having a bimodal particle distribution, and more particularly, to a method for preparing an acrylic impact modifier having two kinds of particle distribution by means of multi-step emulsion polymerization.

(b) Description of the Related Art

Impact modifiers used for improving the impact resistance of vinyl chloride resin include, for example, methyl methacrylate-butadiene-styrene (MBS) based resin, chloropolyethylene (CPE) based resin, and acrylic based resin. Among them acrylic based impact modifiers have good weatherability and are widely used in products that are exposed to sunlight. Particularly, for the applications in window frames where a high impact resistance and weatherability are required, a so-called acrylic graft polymer of a core-shell type is widely used in order to achieve weatherability, wherein the polymer is formed by grafting an acrylic polymer, which has excellent compatibility with vinyl chloride resin, to a rubbery core that is made by crosslinking an alkyl acrylate monomer with a crosslinking agent.

The mechanical properties of an acrylic impact modifier having a core-shell structure is greatly affected by the method of connecting rubbery core and shell through chemical bonding. One of the important factors on which impact resistance and processability of resins depend is the degree of bonding between the dispersed rubber particles and their matrix. The diameter of rubber particles dispersed into the matrix as well as the distance between the rubber particles acts as important factors which affect the processability and impact resistance.

Examples of conventional production methods of impact modifier for vinyl chloride resins include:

a multi-step emulsion polymerization process comprising a step of preparing seed rubber latex having a small particle size, followed by preparing a multilayered rubbery polymer by adding a rubbery polymer-forming monomer and a hard shell polymer-forming monomer sequentially and dividedly in multiple-steps; and a microagglomeration process comprising steps of preparing a primary core-shell rubber latex having a small size (smaller than 1000 Å), making it grow to a desired size through an agglomeration process, and finally forming an encapsulated shell, and thereby impact modifiers having core-shell structures are obtained.

Such latexes prepared by the above methods are acrylic-based impact modifiers having a single particle size and a single type of particle distribution, and are disclosed in U.S. Pat. Nos. 5,612,413 and 5,312,575. When dispersed into a matrix polymer, polymers prepared by the multi-step emulsion polymerization process are dispersed with the state of particle size of final latices, whereas impact modifiers prepared by the micro-agglomeration process are re-dispersed with the state of primary particles, that is, a state of initial particles.

Generally, impact resistance of vinyl chloride resins is known to be satisfactory when the particle size of impact modifier dispersed into a matrix is about 2000 Å and the distances between impact modifier particles are maintained to be under a specific value.

SUMMARY OF THE INVENTION

It is an object of the present invention to provide the method of preparing an impact modifier for vinyl chloride resins which satisfies essential requirements for the improvement of an impact resistance thereof, that is, the particle size of impact modifiers dispersed into the matrix and the distance between the impact modifier particles. Briefly, the present invention is provides the bimodal latex with excellent impact strength and mechanical properties.

Another object of the present invention is to provide an acrylic rubber latex which has excellent impact resistance and weatherability.

DETAILED DESCRIPTION OF THE PREFERRED EMBODIMENTS

In order to achieve the object of the present invention, there is provided a method for preparing an acrylic rubber latex having a bimodal particle distribution, comprising the steps of:

a) preparing seed rubber latex containing the following materials:
  i) alkyl acrylate;
  ii) saturated or unsaturated $C_1$–$C_9$ organic acid; and
  iii) an acrylic multi-unsaturated monomer,
b) preparing a bimodal rubber latex by adding the following materials to the seed rubber latex obtained in a step a):
  i) alkyl acrylate;
  iii) an acrylic multi-unsaturated monomer, and
c) preparing rubber latex by grafting the following material to the bimodal rubber latex obtained in step b):
  iv) alkyl methacrylate.

The present invention will be explained more in detail in the following.

The present invention provides a method for preparing an acrylic rubber latex having a bimodal particle distribution by means of:

a) a seed reaction for preparing rubber latex using a monomer with a low glass transition temperature (Tg), a crosslinking agent, a polymerization initiator and deionized water; b) a core-forming reaction for preparing a bimodal rubber latex consisting of small and large particles by adding a monomer, an emulsifier, a crosslinking agent, an initiator and deionized water to the seed rubber latex; and c) graft polymerization by adding mixed monomers having good compatibility with polyvinyl chloride (PVC) to the bimodal core latex. The acrylic rubber latex prepared by this method has improved the impact strength of vinyl chloride resins through satisfying important factors for the improvement of impact resistance, that is, controlled particle size of impact modifiers dispersed into the matrix and the distances between the impact modifier particles. It has excellent impact resistance and weatherability as expected in core-shell structures.

More specifically, it is preferable to prepare said acrylic rubber latex by a method comprising the steps of:

a) preparing a seed rubber latex having a particle diameter in the range of 500–2000 Å by adding monomers including:
  i) 90 to 99.92 parts by weight of alkyl acrylate having a $C_2$–$C_8$ alkyl group;
  ii) 0.03 to 5.0 parts by weight of a saturated or unsaturated $C_1$–$C_9$ organic acid; and
  iii) 0.05 to 5.0 parts by weight of an acrylic multi-unsaturated monomer, in such a manner that monomer, initiator, emulsifier, and deionized water are charged as a whole; or a pre-emulsion is formed using a monomer, initiator, emulsifier, and deionized water, and then the pre-emulsion is charged as a whole;

b) preparing a bimodal rubber latex consisting of small particles and large particles with diameters respectively in the range of 600–2500 Å and 1500–3500 Å by adding 0.5 to 5.0 parts by weight of emulsifier to the seed rubber latex obtained in step a), and then adding monomers including:
  i) 95 to 99.95 parts by weight of alkyl acrylate having a $C_2$–$C_8$ alkyl group; and
  iii) 0.05 to 5.0 parts by weight of an acrylic multi-unsaturated monomer, in such a manner that monomer, initiator, emulsifier, and deionized water are charged as a whole; or a pre-emulsion is formed using monomer, initiator, emulsifier, and deionized water, and then pre-emulsion is charged as a whole; and c) preparing a bimodal rubber latex polymer having a core-shell structure and consisting of small particles and large particles with diameters in the range of 1000–3500 Å and 2000–4000 Å, respectively, by adding pre-emulsion including:
  iv) 80 to 100 parts by weight of alkyl methacrylate;
  v) not more than 10 parts by weight of ethyl acrylate; and
  vi) not more than 10 parts by weight of acrylonitrile, in such a manner that the pre-emulsion is divided into two or more portions and charged sequentially, or the pre-emulsion is charged continuously to the bimodal rubber latex obtained in step b), and by performing graft polymerization.

In the present invention, a rubbery polymer consisting of seed and core is formed by emulsion polymerization, wherein the polymers consist seed of 1 to 20 parts by weight and core-forming polymers 50 to 94 parts by weight, based on the total weight of polymers.

The polymerization in step b) is accomplished by one or more steps. And if two or more steps are used for the polymerization, it is preferable to conduct them in such a manner that in the first core-forming reaction, (1) a polymer forming monomer, a polymerization initiator, an emulsifier, and deionized water are charged as a whole; or (2) a pre-emulsion is formed using a polymer-forming monomer, a polymerization initiator, an emulsifier, and deionized water, and then it is charged as a whole. And then, in both case, the reagents including monomers in each following step are introduced continuously as a pre-emulsion, wherein the first core polymer comprises preferably at least 5 parts by weight of the total core-forming polymer.

In the present invention, the examples of alkyl acrylates of i) in both step a) and step b) are alky acrylates having $C_2$–$C_8$ alkyl groups such as ethyl acrylate, propyl acrylate, isopropyl acrylate, butyl acrylate, 2-ethylhexyl acrylate, octyl acrylate, or mixtures thereof, and preferably at least one compound is used that is selected from the group consisting of butyl acrylate, 2-ethylhexyl acrylate, and ethyl acrylate, which have relatively low glass transition temperatures.

A rubbery polymer formed by using alkyl acrylate monomers of i) in both step a) and b) has a glass transition temperature of −20° C. or below, and for the purpose of better impact resistance and heat stability, the rubbery polymer preferably comprises at least 80 parts by weight of units derived from alkyl acrylate, while the remainder may comprise a monomer derived from alkyl methacrylate or aromatic compounds. In order to achieve further improvement in the impact resistance and heat stability, It is preferred that the polymer comprises at least 95 parts by weight of alkyl acrylate and that the remainder includes a monomer derived from multi-unsaturated monomers.

The $C_1$–$C_9$ saturated or unsaturated organic acid (including aromatic organic acids) of ii) of step a) is used in an amount of 0.03 to 5.0 parts by weight. In the case of using less than 0.03 parts by weight, particle size control will be inefficient, whereas using more than 5.0 parts by weight will disturb the stability of reaction system. As an example, the organic acid is preferably at least one compound selected from the group consisting of methacrylic acid, acrylic acid, itaconic acid, formic acid, acetic acid, crotonic acid, succinic acid, glutaric acid, adipic acid, suberic acid, and cinnamic acid.

The acrylic multi-unsaturated monomer of iii) in both step a) and b) has two or more carbon-carbon double bonds, and it comprises monomers derived from multi-unsaturated monomers which have acrylic functional group or arylic structures without conjugated double bonds. Examples thereof may be at least one compound selected from the group consisting of 1,3-butanediol acrylate, 1,3-butanediol dimethacrylate, 1,4-butanediol diacrylate, 1,4-butanediol dimethacrylate, aryl acrylate, aryl methacrylate, tetraethylene glycol diacrylate, and tetraethylene glycol dimethacrylate.

The amount of the acrylic multi-unsaturated monomer of iii) in both step a) and step b) is used in the range of 0.05 to 5.0 parts by weight, and if more than 5.0 parts are used, the glass transition temperature becomes high which will result in the reduction of impact resistance; and if less than 0.05 parts are used, the degree of crosslinking is lowered which will reduce processability, and thus it can give rise to problems in processing.

The shell-forming reaction of step c) is carried out with hard polymer-forming monomers having a glass transition temperature of at least 60° C., and monomers containing about 80 to 100 parts by weight of units derived from alkyl methacrylate. In addition, the total polymer of step c) comprise 5 to 30 parts by weight of shell polymer.

The alkyl methacrylate of iv) in step c) may be used alone, or as a mixture with at least one monomer selected from the group consisting of alkyl acrylate such as ethyl methacrylate and butyl acrylate, methacrylate, styrene, methacrylic acid, and acrylonitrile. The alkyl methacrylate is preferable to use methyl methacrylate.

In the method according to the present invention, if necessary, an emulsifier, a crosslinking agent, a polymerization initiator, and deionized water may be added.

More specifically, the emulsifiers are preferably alkaline metal salts of $C_{14}$–$C_{24}$ saturated or unsaturated fatty acid. Furthermore, the amount of the emulsifier used is 0.05 to 0.5 parts by weight in the seed reaction of step a), 0.5 to 5.0 parts by weight before the core-forming reaction and 0.05 to 1.0 parts by weight in the core-forming reaction of step b), and 0.05 to 0.5 parts by weight in the shell reaction of step c).

When a smaller amount is used than is described in each of the above steps, an excessive amount of solid substance is formed due to reduced stability in polymerization, which results in a reduction of productivity.

The polymerization initiator may be selected from the group consisting of potassium persulfate, ammonium persulfate, benzoyl peroxide, azobisbutyronitrile, butyl hydroperoxide and cumyl hydroperoxide, and it is preferable to use potassium persulfate or butyl hydroperoxide.

The present invention will be explained more in detail with reference to the following Examples and Comparative Examples. These examples, however, are intended only for illustrative purpose and not for limitation of the present invention.

EXAMPLES

Example 1

(Preparation of Seed)

Experiment is carried out in a 2-liter reactor equipped with a temperature recorder and mechanical stirrer. The reactor is surrounding by a jacket through which passes a heat-transfer fluid for maintaining the temperature of the system.

415.8 parts by weight of deionized water were introduced, while degassing with nitrogen, into a reactor described above and the temperature was raised to 78° C. When the temperature of the deionized water reached 78° C., 43.56 parts of butyl acrylate, 0.72 parts of 1,3-butanediol diacrylate, 0.72 parts of methacrylic acid, and 24.21 parts of potassium salt of fatty acid (diluted solution to 8%) were added. Then 12.6 parts of potassium persulfate (diluted solution to 3%) were added while maintaining the temperature of the system at 78° C., and then rubber latex was obtained. The degassing with nitrogen was continued until the reaction was completed.

(Preparation of the First Rubbery Core)

276.45 parts of rubber latex obtained by the seed reaction were charged into another reactor and 9.375 parts of potassium salt of fatty acid (diluted solution to 8%) were added to it, then the temperature was raised to 78° C. while degassing with nitrogen. 180.3 parts of deionized water, 288.9 parts of butyl acrylate, 0.35 parts of 1,3-butanediol diacrylate, 0.75 parts of aryl methacrylate, 34.675 parts of potassium salt of fatty acid (diluted solution to 8%), and 8.33 parts of potassium persulfate (diluted solution to 3%) were mixed and stirred to make pre-emulsion, and the pre-emulsion was charged into a reactor as a whole. The temperature at the time of charging was 78° C. The degassing with nitrogen was continued until the reaction was completed.

(Preparation of the Second Rubbery Core)

59.2 parts of deionized water, 109.2 parts of butyl acrylate, 0.15 parts of 1,3-butanediol diacrylate, 0.65 parts of aryl methacrylate, 15.625 parts of potassium salt of fatty acid (diluted solution to 8%), and 6.67 parts of potassium persulfate (diluted solution to 3%) were mixed and stirred to make pre-emulsion, and then they were charged into the reactor in which the first core-forming reaction was finished, by means of a pump, over an 1 hour period. During this process, an internal nitrogen sweep of the reactor was continued and the temperature of the system was kept constant at 78° C. After charging of the pre-emulsified mixture, the reaction mixture was allowed to stand for 1 hour for aging.

(Graft Reaction)

97.4 parts of deionized water, 71.25 parts of methyl methacrylate, 3.75 parts of ethyl acrylate, 2.8 parts of acrylonitrile, 9.375 parts of potassium salt of fatty acid (diluted solution to 8%), and 6.33 parts of potassium persulfate (diluted solution to 3%) were mixed and stirred to make pre-emulsion, and then they were charged into the reactor gradually over an 1.5 hour period. A degassing with nitrogen was carried out in the same way as in the core reaction, and the temperature of the system was kept constant at 78° C. After the charging was finished, the reactants were aged for 1 hour to produce bimodal latices.

Example 2

The same process as in Example 1 was carried out except that 0.54 parts of methacrylic acid were used in the seed reaction.

Example 3

The same process as in Example 1 was carried out except that 0.36 parts of methacrylic acid were used in the seed reaction.

Example 4

The same process as in Example 1 was carried out except that 0.18 parts of methacrylic acid were used in the seed reaction.

Example 5

The same process as in Example 1 was carried out except that 0.2 parts of acrylic acid were used in the seed reaction.

Example 6

(Preparation of Seed)

The same process as in Example 1 was carried out.

(Preparation of Rubbery Core)

276.45 parts of rubber latex prepared by the seed reaction in Example 1 were charged into a reactor and 12.0 parts of potassium salt of fatty acid (diluted solution to 8%) were added, then a degassing with nitrogen was carried out. 600 parts of deionized water, 398.1 parts of butyl acrylate, 0.50 parts of 1,3-butanediol diacrylate, 0.75 parts of aryl methacrylate, 50.3 parts of potassium salt of fatty acid (diluted solution to 8%), and 8.33 parts of potassium persulfate (diluted solution to 3%) were mixed and stirred at room temperature to make pre-emulsion, and then they were charged into a reactor at one time. The temperature at the time of charging was 65° C. The degassing with nitrogen was continued until the reaction was completed.

(Graft Reaction)

The same process as in Example 1 was carried out.

Comparative Example 1

(Preparation of Seed)

336.16 parts by weight of deionized water were charged into a reactor and the temperature was raised to 75° C. while performing a degassing with nitrogen. When the temperature of the deionized water reached 75° C., 39.36 parts of butyl acrylate, 0.64 parts of 1,3-butanediol diacrylate, and 25.0 parts of potassium salt of fatty acid (diluted solution to 8%) were added. Then 11.2 parts of potassium persulfate (diluent solution to 3%) were added while maintaining the temperature at 75° C., and thus rubber latex was obtained.

(Preparation of Rubbery Core)

383.12 parts of deionized water, 596.96 parts of butyl acrylate, 0.8 parts of 1,3-butanediol diacrylate, 2.24 parts of aryl methacrylate, 80.0 parts of potassium salt of fatty acid (diluted solution to 8%), and 24.0 parts of potassium persulfate (diluted solution to 3%) were mixed and stirred to make pre-emulsion, and then the pre-emulsion was charged slowly into a reactor by means of a pump, over a 3 hour period. The reaction mixture was allowed to age for an hour in order to remove unreacted monomers. During the process, the temperature of the reaction mixture was kept constant at 75° C.

(Graft Reaction)

The same process as in Example 1 was carried out.

Comparative Example 2

The same process as in Example 1 was carried out except that 50 parts of potassium salt of fatty acid (diluted solution to 8%) were used in the seed reaction.

Comparative Example 3

The same process as in Example 1 was carried out except that methacrylic acid was not used in the seed reaction.

Comparative Example 4

The same process as in Example 6 was carried out except that methacrylic acid was not used in the seed reaction.

Small amounts of latex prepared in each of the steps of Examples 1 to 6 and Comparative Examples 1 to 4 were taken for particle size measurements. And after filtering off a small amount of solid substances from the latex sample using a 325-mesh filter, the particle size was measured by means of CHDF (capillary hydrodynamic fractionation) and the results are shown in Table 1.

case of Comparative Example 3, the reaction product is not a bimodal-type latex even though the same process as in Example 1 was used, except that methacrylic acid was not used.

The impact modifier resins from the latex obtained in Examples 1 to 6 and Comparative Examples 1 to 4 were isolated through a procedure as follows. Deionized water was added to the polymerized latex to lower its solid content to 10%, and a calcium chloride solution (diluted solution to 10%) was added to the diluted latex while stirring for coagulation. The temperature of the coagulated mixture was raised to 90° C., and kept for 10 minutes for aging and then, the mixture was cooled. The mixture was washed with deionized water two to three times to remove residual emulsifier, and then dehydrated. The dehydrated impact modifier was dried at 85° C. for 2 hours using a fluidized bed dryer, to give impact modifier powder.

The impact strength and mechanical properties of the impact modifier obtained above were evaluated by the following steps. 100 parts of a vinyl chloride resin (degree of polymerization: 1000), 4.0 parts of a stabilizer (lead series), 0.9 parts of an internal lubricant, 0.36 parts of an external lubricant, 1.5 parts of processing aid, and 6.0 parts of a filler ($CaCO_3$) were charged into a henshel mixer at room temperature, then the temperature was raised to 115° C. by increasing the rotation to 1000 rpm, followed by cooling of the mixture to 40° C., and thereby a master batch was prepared. 7 parts of each impact modifier used was added to each master batch, and it was processed by a two-roll mill at 190° C. for 7 minutes to make a sheet of 0.6 mm thickness, and then the sheet was cut to a size of 150 mm×200 mm. After the cut pieces were aligned to be in the same processing direction, they were laminated in a mold having dimensions of 3 mm×170 mm×200 mm. The laminated pieces were treated by preheating (0.5 kg) for 8 minutes and compressing (10 kg) for 4 minutes using a heat-press, and thereby a pressed test piece of 3 mm thickness was prepared. The pressed test piece was precisely cut according to ASTM D-256 to make a test piece for an impact test. The measurement of Izod impact strength was performed at room temperature (25° C.). The above pressed test piece was fabricated to a test piece for mechanical properties according to ASTM D-638, and it was subjected to tests of tensile strength and elongation, the results of which are shown in Table 2.

TABLE 1

| | Diameter of latex particle (Å) | | | |
| --- | --- | --- | --- | --- |
| | | Core | | |
| | Seed | First Core | Second Core | Shell |
| Example 1 | 1700(100) | 1528(30)/2710(70) | 1746(32)/2872(68) | 1845(38)/2990(62) |
| Example 2 | 1302(100) | 987(20)/2278(80) | 1264(21)/2457(79) | 1440(25)/2529(75) |
| Example 3 | 1020(100) | 942(19)/1845(81) | 1194(20)/2105(80) | 1307(21)/2254(79) |
| Example 4 | 780(100) | 790(15)/1510(85) | 1124(18)/1950(82) | 1227(19)/2100(81) |
| Example 5 | 920(100) | 840(22)/1670(78) | 1210(24)/1840(76) | 1340(26)/2320(74) |
| Example 6 | 1650(100) | 1600(26)/2660(74) | | 1340(22)/2230(78) |
| Comp. Ex.1 | 980(100) | 1650(100) | | 1830(100) |
| Comp. Ex.2 | 770(100) | 1420(100) | | 1560(100) |
| Comp. Ex.3 | 860(100) | 1500(100) | 1650(100) | 1790(100) |
| Comp. Ex.4 | 870(100) | 1630(100) | | 1780(100) |

Note:
values within parentheses refer to parts by weight of solid in latex

From Table 1, it can be seen that acrylic impact modifiers prepared by Example 1 to 6 according to the present invention have a bimodal particle size distribution, and that the reaction products of Comparative Examples 1 to 4 exhibit a single particle size distribution. Especially, in the

TABLE 2

|  | Ex.1 | Ex.2 | Ex.3 | Ex.4 | Ex.5 | Ex.6 | Comp. Ex.1 | Comp. Ex.2 | Comp. Ex.3 | Comp. Ex.4 |
| --- | --- | --- | --- | --- | --- | --- | --- | --- | --- | --- |
| Izod impact strength (kg · cm/cm) | 31.0 | 31.6 | 31.2 | 32.2 | 31.4 | 29.3 | 29.6 | 28.2 | 31.8 | 28.5 |
| Tensile strength (kg/cm$^2$) | 488 | 482 | 480 | 482 | 480 | 476 | 478 | 480 | 474 | 468 |
| Elongation (%) | 124 | 128 | 132 | 138 | 132 | 128 | 120 | 118 | 122 | 130 |

Examples 1 to 6 in which the polymer had a bimodal particle distribution exhibit superior impact strength, tensile strength, and elongation to the Comparative Examples 1 to 4 in which the polymer had single particle size distribution.

In the present invention, an acrylic rubber latex was provided that satisfies the important factors for the improvement of impact resistance, i.e., the particle size of the impact modifier dispersed in a matrix and the distance between impact modifiers, thereby improves the impact resistance and weatherability of vinyl chloride resin.

What is claimed is:

1. A method for preparing an acrylic rubber latex having a bimodal particle distribution, comprising the steps of:
   a) preparing seed rubber latex containing the following materials:
      i) alkyl acrylate;
      ii) saturated or unsaturated $C_1$–$C_9$ organic acid; and
      iii) an acrylic multi-unsaturated monomer,
   b) preparing a bimodal rubber latex by adding the following materials to the seed rubber latex obtained in step a):
      i) alkyl acrylate;
      iii) an acrylic multi-unsaturated monomer, and
   c) preparing rubber latex by grafting the following material to the bimodal rubber latex obtained in step b):
      iv) alkyl methacrylate.

2. The method of claim 1, comprising the steps of:
   a) preparing a seed rubber latex having a particle diameter in the range of 500–2000 Å by adding monomers including:
      i) 90 to 99.92 parts by weight of alkyl acrylate;
      ii) 0.03 to 5.0 parts by weight of saturated or unsaturated $C_1$–$C_9$ organic acid; and
      iii) 0.05 to 5.0 parts by weight of an acrylic multi-unsaturated monomer,
   in such a manner that monomer, initiator, emulsifier, and deionized water are charged as a whole; or a pre-emulsion is formed using a monomer, initiator, emulsifier, and deionized water, and then the pre-emulsion is charged as a whole, and by performing a seed reaction;
   b) preparing a bimodal rubber latex consisting of small particles and large particles whose diameters are respectively in the range of 600–2500 Å and 1500–3500 Å by adding monomers to the seed rubber latex obtained in step a) including:
      i) 95 to 99.95 parts by weight of alkyl acrylate; and
      iii) 0.05 to 5.0 parts by weight of an acrylic multi-unsaturated monomer,
   in such a manner that monomer, initiator, emulsifier, and deionized water are charged as a whole; or a pre-emulsion is formed using monomer, initiator, emulsifier, and deionized water, and then pre-emulsion is charged as a whole, and by performing a core-forming reaction; and
   c) preparing a bimodal rubber latex polymer having a core-shell structure and consisting of small particles and large particles whose diameters are respectively in the range of 1000–3500Å and 2000–4000 Å, respectively, by pre-emulsifying monomers including:
      iv) 80 to 100 parts by weight of alkyl methacrylate;
      v) not more than 10 parts by weight of ethyl acrylate; and
      vi) not more than 10 parts by weight of acrylonitrile,
   in such a manner that the pre-emulsion is divided into two or more portions and charged sequentially, or the pre-emulsion is charged continuously to the bimodal rubber latex obtained in step b), and by performing graft polymerization.

3. The method of claim 1, wherein the alkyl acrylates of i) in both steps a) and b) comprise at least one $C_2$–$C_9$ alkyl acrylate.

4. The method of claim 1, wherein the $C_1$–$C_9$ saturated or unsaturated organic acid of ii) in step a) comprises at least one compound selected from the group consisting of methacrylic acid, acrylic acid, itaconic acid, formic acid, acetic acid, crotonic acid, succinic acid, glutaric acid, adipic acid, suberic acid, and cinnamic acid.

5. The method of claim 1, wherein the acrylic multi-unsaturated monomers of in iii) in both steps a) and b) comprise at least one compound selected from the group consisting of 1,3-butanediol acrylate, 1,3-butanediol dimethacrylate, 1,4-butanediol diacrylate, 1,4-butanediol dimethacrylate, aryl acrylate, aryl methacrylate, tetraethylene glycol diacrylate, and tetraethylene glycol dimethacrylate.

6. The method of claim 1, wherein the reaction of step b) is a core-forming reaction, which is carried out via at least one step.

7. The method of claim 1, wherein in the case of one-step polymerization, the polymer-forming monomers are added as a whole; and in the case of two-step or multi-step polymerizations, the polymer-forming monomers are added as a whole in a first core-forming step and then the rest of polymer-forming monomers are added continuously in the following steps.

8. The method of claim 2, wherein the difference of particle sizes between the small particles and the large particles prepared in step c) is not less than 500 Å.

9. The method of claim 3, wherein said at least one $C_2$–$C_8$ alkyl acrylate is selected from the group consisting of ethyl acrylate, propyl acrylate, isopropyl acrylate, butyl acrylate, 2-ethylhexyl acrylate, octyl acrylate, and mixtures thereof.

10. The method of claim 1, wherein the $C_1$–$C_9$ saturated or unsaturated organic acid is a $C_1$–$C_9$ saturated or unsaturated aromatic organic acid.

* * * * *